(12) United States Patent
Sasaki et al.

(10) Patent No.: US 6,238,100 B1
(45) Date of Patent: May 29, 2001

(54) OPTICAL MODULE AND A METHOD FOR FABRICATING A SAME

(75) Inventors: Junichi Sasaki; Tomoaki Kato; Masataka Itoh, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/421,041

(22) Filed: Oct. 20, 1999

(30) Foreign Application Priority Data

Oct. 21, 1998 (JP) .................................................. 10-300086

(51) Int. Cl.$^7$ ................................ G02B 6/38; G02B 6/36
(52) U.S. Cl. ................................................. 385/59; 385/89
(58) Field of Search ........................... 385/59, 89, 88–94, 385/76

(56) References Cited

U.S. PATENT DOCUMENTS

| | | | | |
|---|---|---|---|---|
| 5,499,311 | * | 3/1996 | DeCusatis | 385/89 |
| 5,500,914 | * | 3/1996 | Foley et al. | 385/77 |
| 5,640,477 | * | 6/1997 | Anderson | 385/89 |
| 5,796,896 | * | 8/1998 | Lee | 385/59 |
| 5,818,990 | * | 10/1998 | Steijer et al. | 385/49 |
| 5,978,531 | * | 11/1999 | Funabashi | 385/45 |

OTHER PUBLICATIONS

Takaya, et al., "An easily–assembled optical device for coupling single–mode planar waveguides to a fiber array", Technical Digest Integrated Photonics Research, IWH2, 1996.

* cited by examiner

Primary Examiner—Robert H. Kim
Assistant Examiner—Michael P. Stafira
(74) Attorney, Agent, or Firm—McGinn & Gibb, PLLC

(57) ABSTRACT

A semiconductor optical amplifier is mounted on a substrate which is provided for a package. Fiber blocks in which plural parallel internal optical fibers are supported are fitted to the package. The optical fibers are optically coupled with the semiconductor optical amplifier via optical waveguides formed on the substrate. V grooves for supporting the optical fibers which protrude out from the fiber block are formed on the substrate. Positionings of the optical fibers are performed by fitting the fiber blocks to the package so that end faces of the optical fibers butt against end walls of the V grooves.

23 Claims, 9 Drawing Sheets

OPTICAL MODULE AND A METHOD FOR FABRICATING A SAME

FIELD OF THE INVENTION

The invention relates to an optical module to be connected with an optical fiber connector used in an optical communication and a method for fabricating the same.

BACKGROUND OF THE INVENTION

In an optical transmission apparatus which is provided with a great number of laser diode, photo-detector or semiconductor optical amplifier array modules and transmits or receives optical signals via optical fiber arrays, disposal of excess pigtails of optical modules mounted on a board is important. Especially, in the transmission apparatus for processing the high bit rate optical signals of several Gb/s, it is necessary to control the lengths of the optical fibers in the order of cm. Two ways can be devised for controlling the lengths of the optical fibers. In the first way, the lengths of the respective pigtails are separately controlled internally in the optical module. In the second way, an optical fiber connector supporting the external optical fibers, the lengths of which are respectively controlled, is fabricated, and the optical module is connected with and removed from the aforementioned optical fiber connector. In the second way, the lengths of the optical fibers can be more easily controlled than in the first way, and the space on the board can be saved.

On the optical module to be connected with the optical fiber connector designed for a multi-mode optical fiber array in which tolerance limits of misalignments of optical axes of the optical fibers are comparatively loose, many developments of optical parallel interconnection modules have been reported. However, with the further expansion of the transmission capacity and the extension of the transmission distance expected in future, the realization of the optical module to be connected with the single mode optical fibers is expected.

Moreover, in order to realize miniaturization of the optical module having the function of an optical switching and a wavelength selecting in the multi-channel optical transmission system, a hybrid integrated structure in which an optical device is integrated with an optical waveguide device, such as a planar optical circuit, is desired. In the aforementioned structure, it becomes necessary to connect the optical waveguides with the single mode optical fiber array with high effeciency.

Figure 1A:
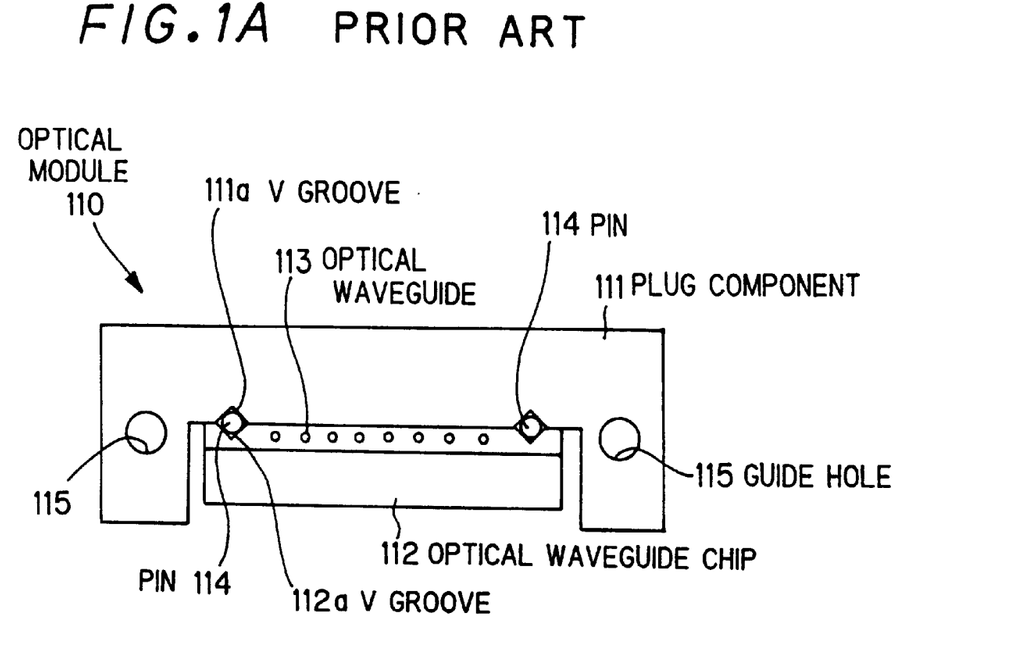
FIGS. 1A and 1B respectively show front views of a conventional optical module and an conventional optical fiber connector.
Figure 1B:
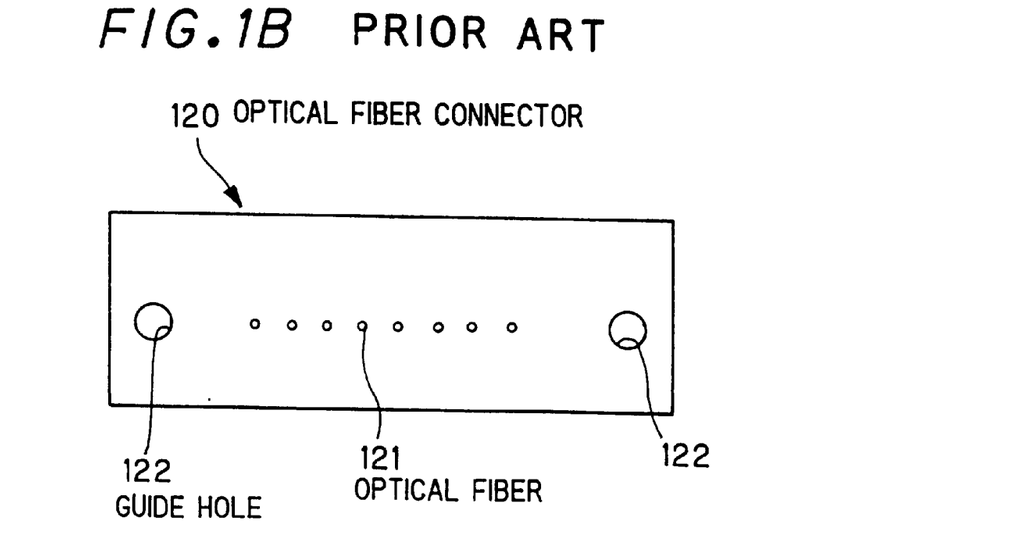

Hitherto, as means for connecting the optical waveguides with the optical fiber array which lies between the optical waveguides and the optical fiber connector, the structure shown in FIGS. 1A and 1B is known (M. Takaya, et. al., Technical Digest Integrated Photonics Research, IWH2, 1996)

As shown in FIG. 1A, an optical module 110 is fabricated by sticking a plug component 111 and an optical waveguide chip 112 together. In the optical waveguide chip 112, plural optical waveguides 113 are formed in parallel each other. On the inner surfaces of the plug component 111 and the optical waveguide chip 112, V grooves 111a and 112a are respectively formed, and a positioning of the plug component 111 relative to the optical waveguide chip 112 is performed by inserting pins 114 into the V grooves 111a and 112a.

Near both the side ends of the plug component 111, guide holes 115 for positioning the plug component 111 relative to the optical fiber connector 120 shown in FIG. 1B are formed. As shown in FIG. 1B, plural optical fibers 121 running in parallel with each other are buried in the optical fiber connector 120, and guide holes 122 for positioning the optical fiber connector 120 relative to the optical module 110 are formed near both the side ends of the optical fiber connector 120.

Positioning of the optical fiber connector 120 relative to the optical module 110 are performed by inserting guide pins (not shown) into the guide holes 122 and 115, and thereby the optical waveguides 113 of the optical module 110 are connected with the optical fibers 121 of the optical fiber connector 120.

In the structure for connecting the optical fibers 121 with the optical module 110 by means of the optical fiber connector 120, it is very important that end faces of the optical fibers 121 and the optical guide 113 are flattened. Accordingly, both the end faces are specularly polished.

However, in the aforementioned conventional optical module, it is necessary to stick the waveguide chip and the plug component together with high accuracy in order to specularly polish the end face of the optical waveguide, but the aforementioned sticking process is very difficult. The reason is that, although positionings of the optical waveguides in the horizontal and vertical directions are successfully performed because of the existence of the pins, the aforementioned structure has no means for positionings the optical waveguides in the direction of the optical axes thereof.

Moreover, a heavy load is applied to the optical module in case that the optical fiber connector is connected with or removed from the optical module. However, since the optical module is formed by sticking the optical waveguide chip and the plug component together with adhesion, the optical module cannot withstand the aforementioned load applied thereto.

As a method for increasing the strength of the optical module, a following one can be devised. That is to say, the optical waveguides are sandwiched by two parallel reinforcing plates near the end face of the optical waveguides, which are opposed to the fiber block (the optical fiber array) face to face. Then, the position of the fiber block relative to the optical waveguides is optimized by monitoring intensities of lights emitted from the fiber block, and the are stuck together. However, according to this method, since complicated works for aligning to the optical axes are added, it is undesirable from viewpoints of an increasing in cost and low productivity.

SUMMARY OF THE INVENTION

Accordingly, it is an object of the present invention to provide an optical module which withstands a force applied thereto in case that an external optical fiber connector is connected with an removed from an optical module and makes optical adjustments for aligning optical axes unnecessary.

It is a further object of the invention to provide a method for fabricating an optical module which withstands a force applied thereto in case that an external optical fiber connector is connected with and removed from an optical module and makes optical adjustments for aligning optical axes unnecessary.

According to the first feature of the invention, an optical module to be connected with an removed from an external optical fiber connector supporting plural parallel optical fibers for an optical signal transmission (optical fibers for transmission, hereinafter), comprises:

a substrate on which an optical device is mounted, a basic member on which the substrate is mounted, a block which fits to the basic member at a side end thereof, partially projects plural parallel internal optical fibers (optical fibers, hereinafter) to be connected with the optical device at a first end face of the block, and support remainders of the internal optical fibers so that end faces of the remainders are exposed at a second end face of the block, and plural parallel V grooves (V grooves, hereinafter) which have end walls, are formed on the substrate and supports the respective internal optical fibers projected from the block, wherein a lateral pitch of the V grooves are a same as that of the optical fibers.

In the optical module according to the invention, the plural optical fibers are supported by a block, which is fitted to the basic member. The optical fibers projected from the first end face of the block are supported by the V grooves, which are respectively formed on the substrate. The position of the optical fiber supported by the V groove on a horizontal axis which corresponds to the width direction of the optical fibers arranged in parallel with each other is determined by a position of the V groove. The height of the aforementioned optical fiber above the substrate is determined by a width of the V groove. The position of the optical fiber on the optical axis thereof is determined by butting a leading end of the optical fiber against an end wall of the V groove. Positionings of the optical fibers on the various axes are mechanically performed by fitting the block to the basic member. Accordingly, there is no necessity for conducting optical adjustments in order to align the optical axes of the optical fibers with those of optical waveguides lying between the optical fibers and the optical device. Since the optical fiber connector is connected with the second end face of the block on which end faces of the optical fibers are exposed, a load is applied to the block in case that the optical fiber connector is connected with the optical module. However, since the optical fibers are buried in and supported by the block, the positions of the optical fibers are not shifted, when the optical fiber connector is repeatedly connected with and removed from the optical module.

It is desirable that the optical device is mounted on the substrate via solder bumps having a predetermined volume. Thereby the optical device can be mounted on the substrate with high accuracies in a position and a height thereof.

Moreover, an optical mode filed converter may be integrated on each optical fiber, and a grating may be provided for each optical fiber. The optical fibers may be divided in the middle of the fiber block, and an optical isolator or an optical wavelength filter may be inserted between the divided optical fibers.

According to the second feature of the invention, a method for fabricating an optical module to be connected with and removed from an optical fiber connector supporting plural parallel optical fibers for an optical signal transmission (optical fiber for transmission, hereinafter), comprises the steps of:

forming a block for supporting plural parallel optical fibers (optical fibers, hereinafter) so that the block partially projects the optical fibers at first end face of the block and exposes end faces of remainders of the optical fibers at a second end face of the block, forming plural parallel V grooves (V grooves, hereinafter) having end walls and a same lateral pitch as that of the optical fibers on a substrate so that the projected optical fibers can be supported the V grooves, mounting the substrate having the optical device mounted thereon on a basic member, and fitting the block to the basic member at a side end thereof in condition that the optical fibers are inserted into the V grooves and butt against the end walls of the V grooves.

In the method for fabricating the optical module, when the block is fitted to the basic member, the positions of the optical fiber on the horizontal and vertical axes are respectively determined by the position and the width of the V groove, and the position of the optical fiber on the optical axis thereof is determined by butting the leading end of the optical fiber against the end wall of the V groove. Accordingly, the optical module can be fabricated without conducting optical adjustments for aligning the optical axes of the internal optical fibers with those of the optical device. Moreover, since the optical fibers are buried in and supported by the block, the positions of the optical fibers are not shifted, even when the external optical fiber connector is repeatedly connected with and removed from the optical module.

Since the step of mounting the optical device on the substrate comprises the steps of forming solder bumps on solder-wettable pads previously formed on the substrate, setting the optical device having a bottom surface on which joining pads are previously formed on the solder bumps, melting the solder bumps, and pressing the optical device against the substrate, the optical device can be mounted on the substrate with high accuracy in positioning by the self alignment function of the solder bumps. Especially in this case, since the steps of forming solder bumps comprises the steps of setting punched solder sheets which are formed by punching a solder sheet having a predetermined thickness on the solder-wettable pads, and thermally pressing the punched solder sheets against the solder-wettable pads, volumes of the solder bumps can be equalized. As a result, the height of the optical device above the substrate becomes constant.

The step of forming the block may comprises the steps of previously integrating an optical mode field converter on a long optical fiber or previously forming gratings on a long optical fiber at a predetermined interval, and providing plural short optical fibers to be supported by the block by dividing the long optical fiber. Moreover, the method for fabricating the optical module may further comprises the steps of dividing the optical fibers in the middle of the block, and inserting an optical isolator or an optical wavelength filer into the divided optical fibers.

BRIEF DESCRIPTION OF THE DRAWINGS

The invention will be explained in more detail in conjunction with appended drawings, wherein.

DESCRIPTION OF THE PREFERRED EMBODIMENTS

Embodiments of the invention will be explained referring to appended drawings.

Figure 2:
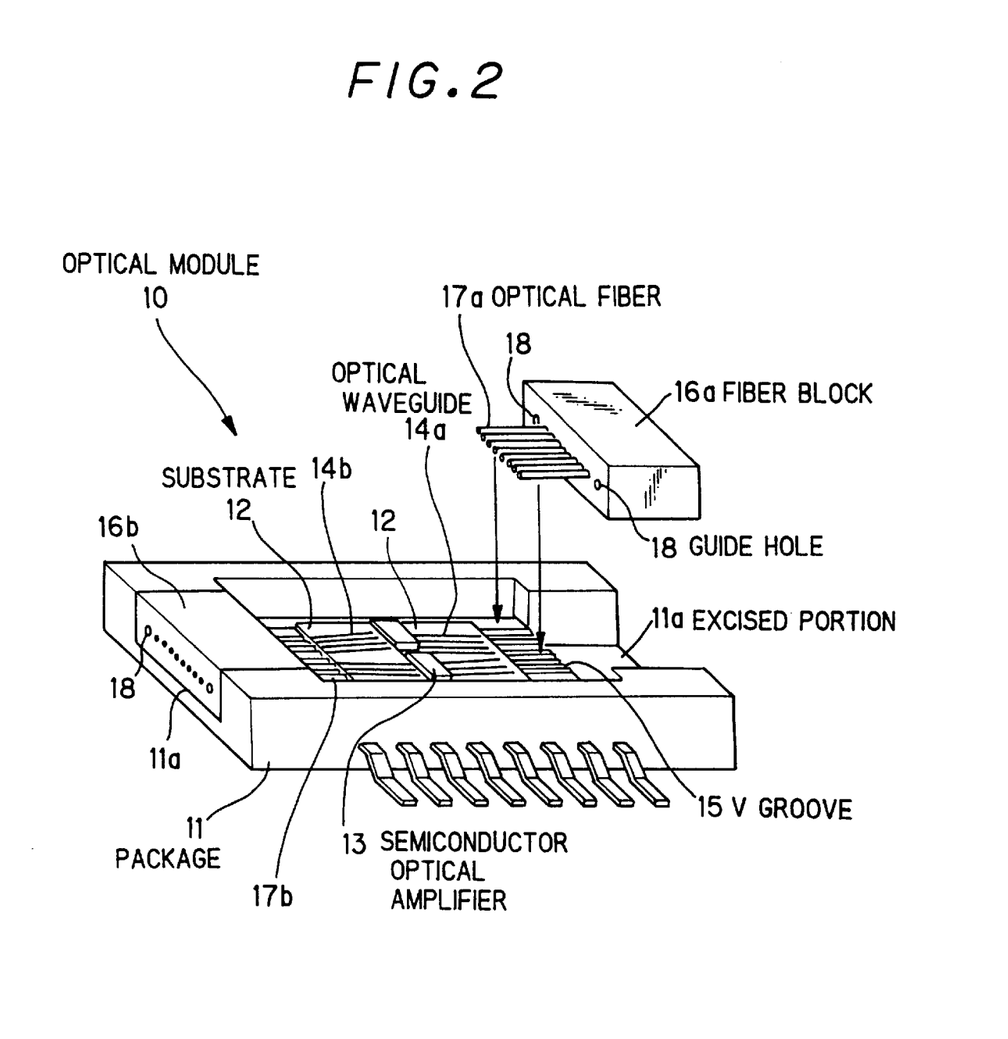
FIG. 2 show a perspective view of an optical module according to the first preferred embodiment of the invention.
Figure 3:
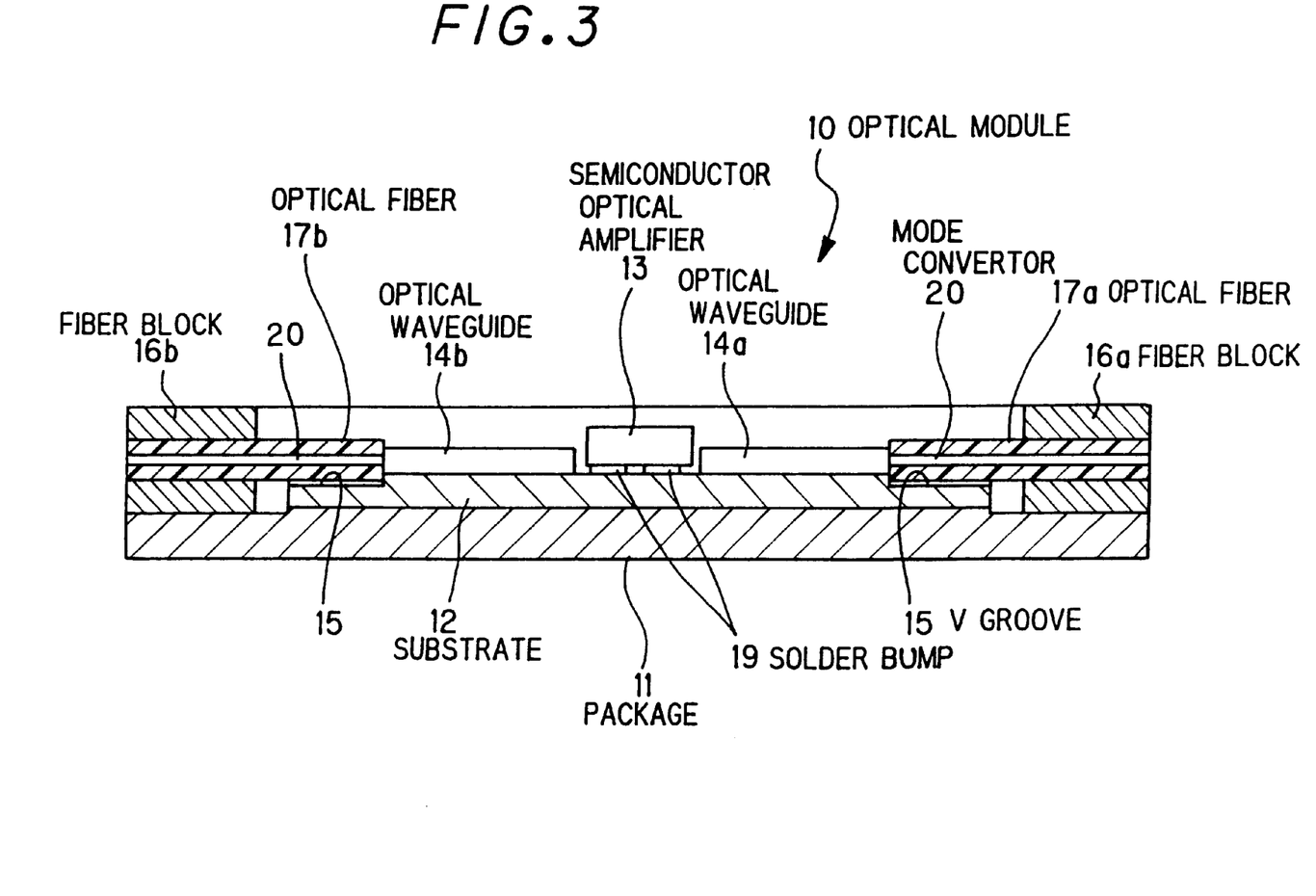
FIG. 3 shows a cross-sectional view A—A of an optical module shown in FIG. 2 in a vertical cross-section.

FIG. 2 shows a perspective view of an optical module according the first preferred embodiment of the invention. FIG. 3 shows a cross-sectional view of the optical module shown in FIG. 2 taken along a direction of transmission of an optical signal (in a vertical cross-section, hereinafter).

In an example of the embodiments shown in FIG. 2, the invention is applied to a semiconductor optical amplifier module of eight channels. As shown in FIGS. 2 and 3, a semiconductor substrate 12 formed of Si is provided for a package 11, and a semiconductor optical amplifier 13 serving as an optical device is mounted an the substrate 12 at a center area thereof. Excised portions 11a are formed at both side ends of the package 11, and fiber blocks 16a and 16b which respectively support eight optical fibers 17a and 17b are fitted into both the excised portions 11a. The interior of the package 11 is hidden by a cover, which is omitted in FIGS. 2 and 3.

On a part of the substrate 12 lying between the optical fibers 17a and the semiconductor optical amplifier 13, plural planar optical waveguides 14a for guiding optical signals supplied from the optical fibers 17a to the semiconductor optical amplifier 13 are formed corresponding to the internal optical fibers 17a. Moreover, on another part of the substrate 12 lying between the optical fibers 17b and the semiconductor optical amplifier 13, plural planar optical waveguides 14b for guiding the output optical signals of the semiconductor optical amplifier 13 to input ends of the optical fibers 17b are formed corresponding to the optical fibers 17b. The optical waveguides 14a and 14b are formed by depositing $SiO_2$ on the substrate 12 by the CVD method.

The fiber block 16a and 16b are respectively provided with the eight internal optical fibers 17a and 17b having the lengths of about 10 mm. Parts of the optical fibers 17a and 17b respectively protrude out from the left and right end faces of the fiber blocks 16a and 16b by 5 mm. Remaining parts of the parallel optical fibers 17a and 17b are respectively buried in the fiber blocks 16a and 16b with a predetermined lateral pitch. The end faces of the buried optical fibers 17a and 17b are respectively exposed at the right and left end faces of the fiber blocks 16a and 16b in order to connect optically with external optical fiber connectors (not shown).

Guide holes 18 are formed near both side ends of the fiber blocks 16a and 16b. Positions of the centers of the guide holes 18 and optical axes of the optical fibers 17a and 17b respectively almost coincide with the positions of centers of guide pins 52 and optical axes of optical fibers 53 of a later mentioned optical fiber connector 50 (see FIG. 4).

In the fabrication process of the fiber blocks 16a and 16b in which the optical fibers 17a and 17b are buried, the optical fibers 17a and 17b are inserted into resin material, and the fiber blocks 16a and 16b are respectively formed by integral molding. It is desirable that material which shows contraction of a small amount at the time of hardening is selected as one for forming the fiber blocks 16a and 16b.

The optical signals are supplied to the semiconductor optical amplifier 13 via the optical fibers 17a and the planar optical waveguides 14a, both being situated on the input side. If the semiconductor optical amplifier 13 is supplied with a current, the optical signal incident on the semiconductor optical amplifier 13 transmits therethrough and is outputted to the optical fibers 17b via the planar optical waveguides 14a, both being situated on the output side. If the aforementioned current is stopped, the semiconductor optical amplifier 13 absorbs the optical signal incident thereon, and interrupts the optical signal. Thereby, a gate action against the optical signal is performed.

Figure 4:
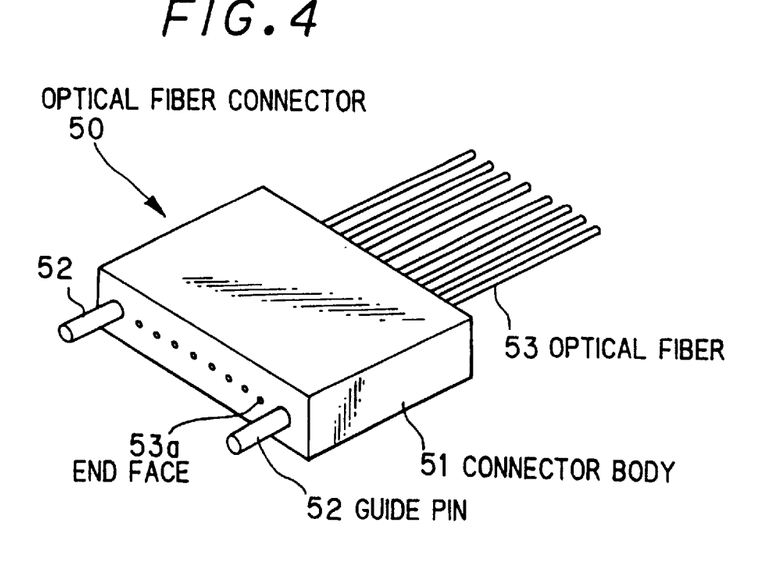
FIG. 4 shows a perspective view of an external optical fiber connector to be connected with an optical module shown in FIG. 2.

The optical signals are inputted to and outputted from the optical module 10 via an optical fiber connectors 50 shown in FIG. 4.

The optical fiber external connector 50 is constructed so that the eight external optical fibers 53 are supported by an connector body 51 in parallel with each other. The lengths of the optical fibers 53 are controlled in the order of cm, and the end face 53a thereof to be connected with the optical module 10 are specularly polished. The lateral pitch of the optical fiber 53 is the same as that of the optical fibers 17a and 17b in the optical module 10. On the end face of the optical fiber connector 50 to be connected with the optical module 10, two guide pins 52 corresponding to the optical guide holes 18 of the optical module 10 are formed.

Figure 5:
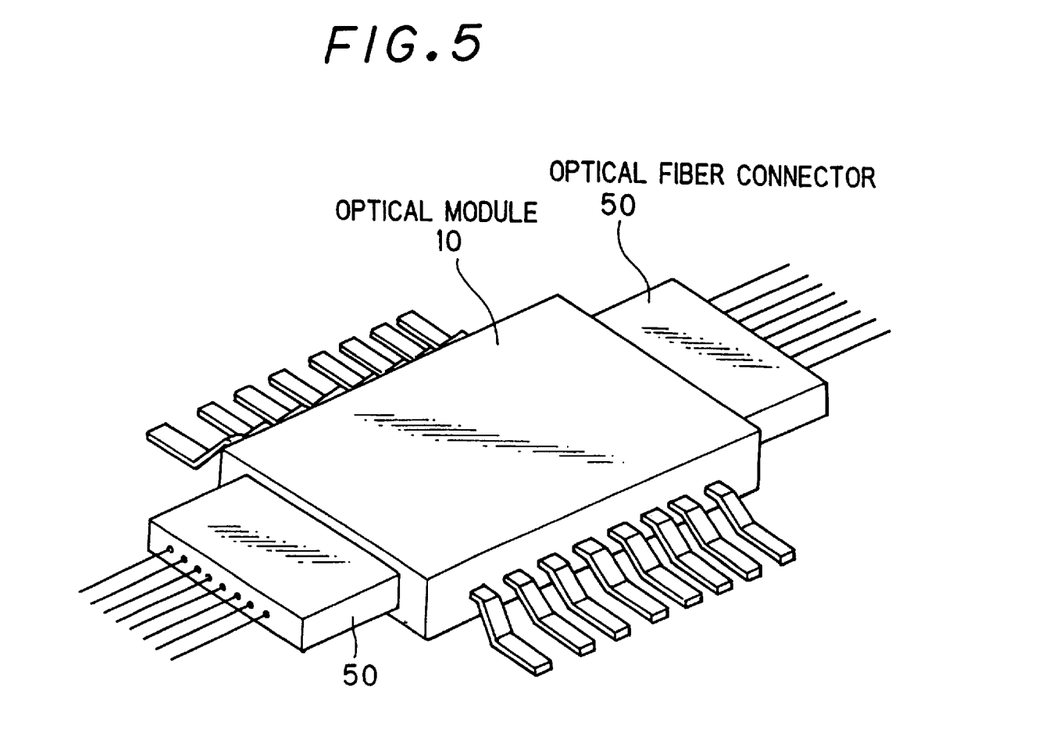
FIG. 5 shows a perspective view of an optical module shown in FIG. 2 in a state that the optical fiber connector shown in FIG. 4 is connected therewith.

As shown in FIG. 5, the optical fiber connector 50 is connected with the optical module 10 by inserting the guide pins 52 into the guide holes 18 of the optical module 10, hence the optical signal can be inputted to and outputted from the optical module 10.

In the optical module 16 according to the first preferred embodiment of the invention, a signal amplification function can be obtained by supplying an electric current to the semiconductor optical amplifier 13 as needed. However, in the semiconductor optical amplifier module, if the end face of the optical fibers 17a and 17b exist at the input and output ports of the semiconductor optical amplifier 13, a Fabry-Perot resonator is formed by the reflections of the light at both the end faces of the optical fibers, and an "oscillation" arises, which is the most undesirable situation for the semiconductor optical amplifier. In order to prevent such a situation, the optical waveguides 14a and 14b are inserted between the optical fibers 17a and 17b and the semiconductor optical amplifier 13, and an active layers of the semiconductor optical amplifier 13 and the optical waveguides 14a and 14b are designed so that the directions of the lights incident on optically coupling regions lying between the semiconductor optical amplifier 13 and the optical waveguides 14a and 14b are oblique.

In case that mode field diameters of the optical waveguides 14a and 14b are different from those of the optical fibers 53 (see FIG. 4) to be connected with the optical module 10, coupling efficiencies therebetween can be improved by integrating mode convertors (optical mode field convertors, see FIG. 3) 20 on the optical fibers 17a and 17b. The mode convertors 20 are previously integrated on the long optical fibers 17a and 17b at a predetermined interval. The long optical fibers 17a and 17b on which the mode convertors 20 are integrated are divided into the short optical fibers, which are buried in the fiber blocks 16a and 16b, hence there is no necessity for separately integrating the mode convertors 20 on the respective optical fibers 17a and 17b, and thereby the optical module 10 comprising the optical fibers 17a and 17b on which the mode convertors 20 are integrated can be easily fabricated.

Thereafter, means for aligning the optical axes of the semiconductor optical amplifier 13 with those of the optical fibers 17a and 17b will be explained.

Figure 6A:
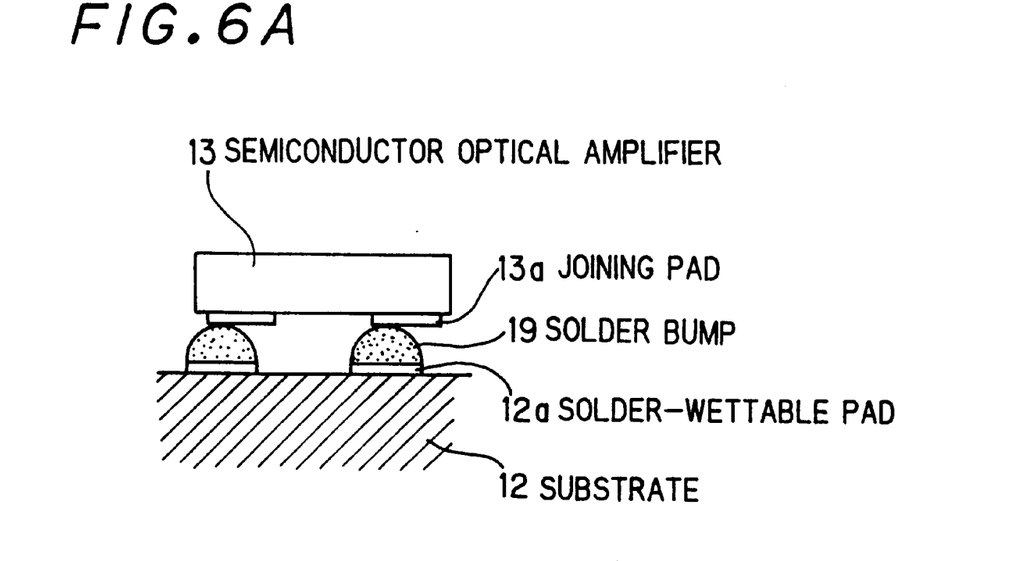
FIGS. 6A to 6C show cross-sectional views explaining a method for mounting an optical device on a substrate.

As shown in FIG. 3, The semiconductor optical amplifier 13 in a state of a bare chip is mounted on the substrate 12 via solder bumps 19. A method of mounting the semiconductor optical amplifier 13 on the substrate 12 will be explained referring to FIGS. 6A to 6C. As shown in FIG. 6A, joining pads 13a are previously formed on the top surface of the substrate 12, and hemispherical solder bumps 19 are formed on the respective solder-wettable pads 12a. Then, the semiconductor optical amplifier 13 are set on the solder bumps 19, the substrate 12 is heated, the semiconductor optical amplifier 13 is pressed against the substrate 12 in condition that the solder bumps 19 are melted, and the semiconductor optical amplifier 13 is mounted on the substrate 12.

Figure 6B:
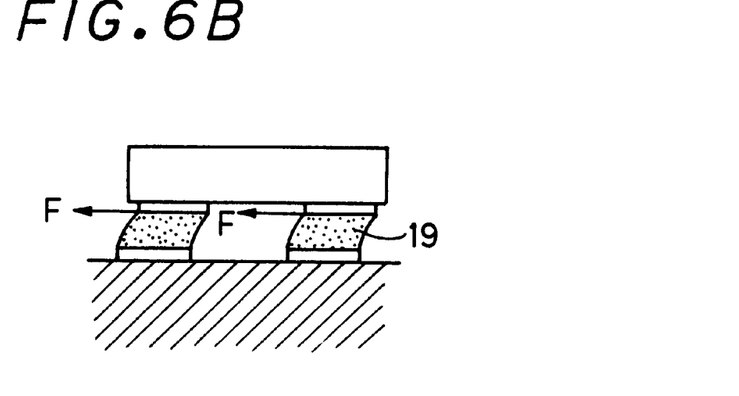
Figure 6C:
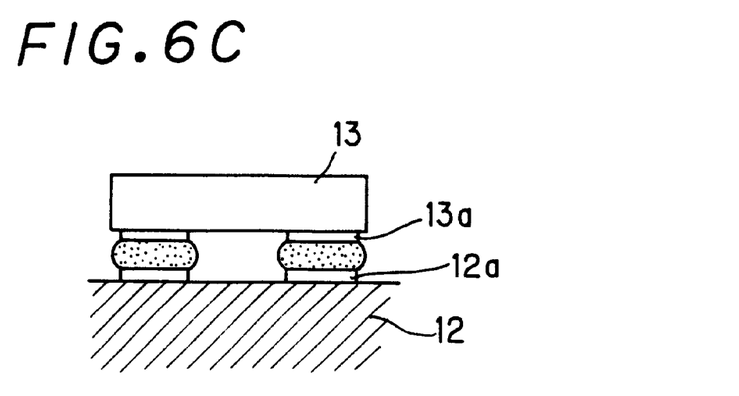

In case that the semiconductor optical amplifier 13 is set on the solder bumps 19, even if the position of the semiconductor optical amplifier 13 is shifted relative to the solder bumps 19 as shown in FIG. 6A, restoring forces caused by surface tensions of the melted solder bumps 19 are applied to the solder bumps 19 as shown in FIG. 6B. As shown in FIG. 6C, the positions of the joining pads 13a relative to the solder-wettable pads 12a, in other words the position of the semiconductor optical amplifier 13 mounted on the substrate 12, is automatically regulated with high accuracy by the aforementioned self alignment effect of soldering.

It is desirable that material of the solder bumps 19 is eutectic alloy containing Au of 80 weight percent and Sn of 20 weight percent. According to this alloy, joining by means of fluxless soldering with high accuracy is possible, and a shift off of a soldered object caused by creep of solder hardly occurs. In this embodiment, the solder-wittable pad 12a has a shape of stripe with dimensions of 140 µm×25 µm, and a height of the bump 19 after joining is 17 µm. According to the aforementioned data, the high accuracy within ±1 µm can be obtained in the horizontal axis.

It is suitable that melting of the solder bump 19 is performed in a nitrogen atmosphere with oxygen concentration not exceeding 100 ppm and an ambient temperature is 330° C. If oxygen concentration of nitrogen atmosphere is high, an oxidized film is produced on a surface of melted solder, and a satisfactory self alignment effect cannot be achieved. It is desirable that material of the joining pad 13a and the solder-wettable pad 12a is Au which is rich in wettablity to AuSn solder. Regions surrounding the solder-wettable pads 12a and the joining pads 13a should be formed of $SiO_2$ or etc. which has no wettability to solder.

On the other hand, V grooves 15 which extend from the side ends of the optical waveguides 14a and 14b to both the end faces of the substrate 12 are situated on the top surface of the substrate 12 as shown in FIG. 3. The V grooves 15 are divided into the left and right groups, each of which contains the eight V grooves corresponding to the optical fibers 17a or 17b. The lateral pitch of the V grooves 15 is the same as that of the optical fibers 17a or 17b. The V groove 15 is formed by anisotropic etching using KOH for instance. The aforementioned solder-wettable pads 12a (see FIG. 6A), the center lines of the optical waveguides 14a and 14b and the center lines of the V grooves 15 are respectively situated on their predetermined positions with high accuracy by means of patterning based on a series of photolithography processes.

The optical fibers 17a and 17b are inserted into the respective V grooves 15 by fitting the fiber blocks 16a and 16b to the excised portions 11a of the package 11, and thereby optical transmission lines extending from the optical fibers 17a and 17b to the semiconductor optical amplifier 13 are formed. In the aforementioned transmission lines, the positions of the optical fibers 17a and 17b on the horizontal axis which is vertical to the optical axes of the optical fibers 17a and 17b (the horizontal axis, hereinafter) are determined by the positions of the V grooves 15, and the heights of the optical fibers 17a and 17b above the substrate 12 are determined by widths of the V grooves 15. Moreover, the heights of the optical axes of the semiconductor optical amplifier 13 are determined by the sizes (the volumes) of the solder bumps 19.

Figure 7A:
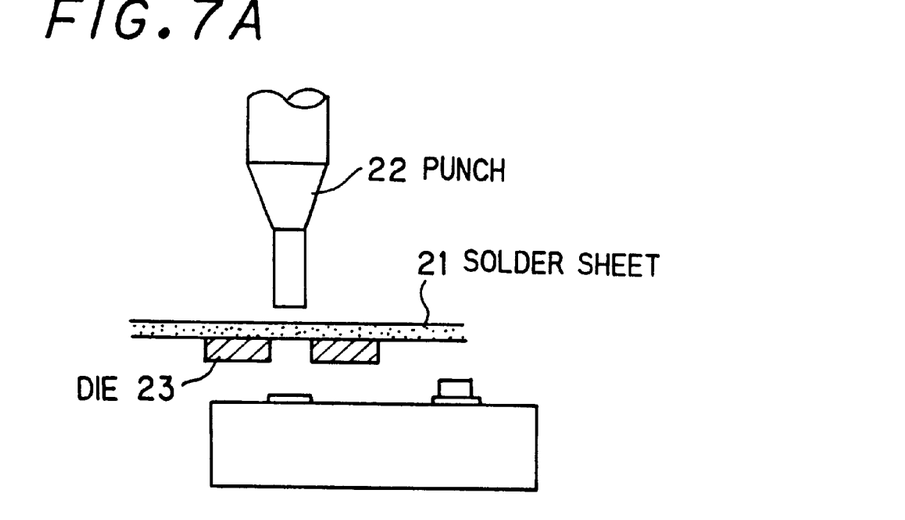
FIGS. 7A to 7C show cross-sectional views explaining a method for forming solder bumps on a substrate.
Figure 7B:
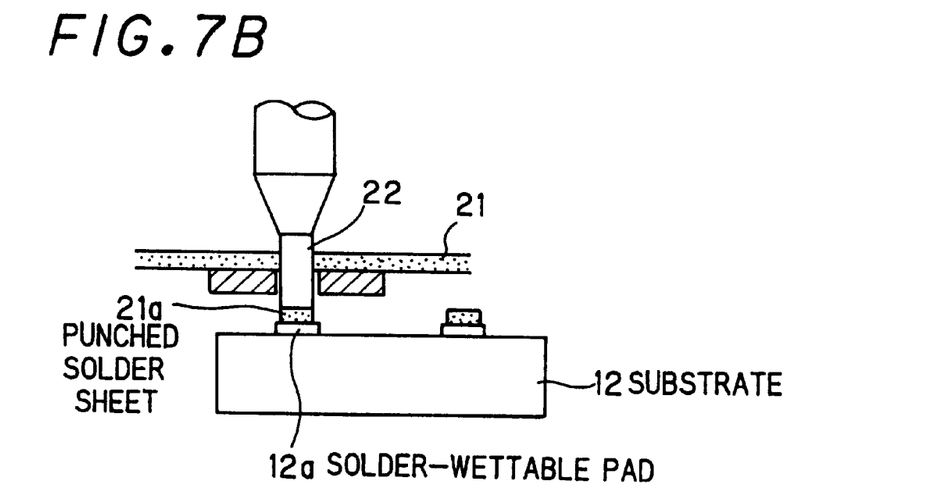
Figure 7C:
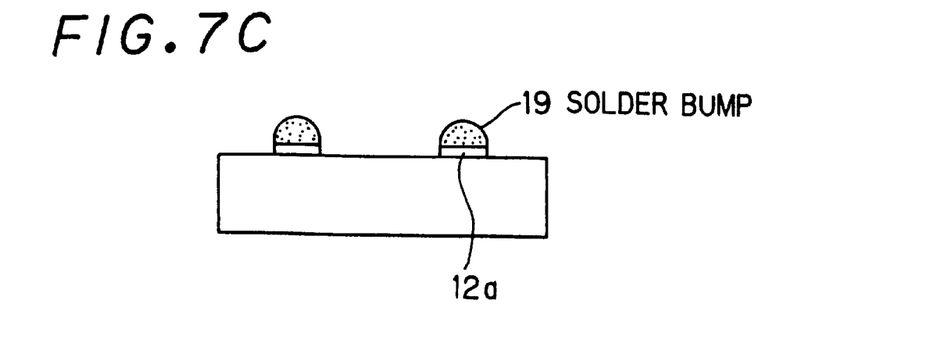

The solder bumps is having an equal size can be obtained by means of a micro-press as shown in FIGS. 7A to 7C. That is to say, as shown in FIG. 7A, a solder sheet 21 having an uniform thickness, and a set of a punch 22 and a die 23 for punching the solder sheet 21 are prepared. As shown in FIG. 7B, the solder sheet 21 is punched by the punch 22 on the solder-wettable pad 12a, and a punched solder sheet 21a is set on the solder-wettable pad 12a. The hemispherical solder bump 19 having a predetermined volume is formed on the solder-wettable pad 12a by thermally pressing the punched solder sheet 21a against the solder-wettable pad 12a as shown in FIG. 7C.

Now, let us again return to FIGS. 2 and 3. Concerning the positionings of the fibers 17a and 17b in the direction of the optical axes of the same in the aforementioned optical transmission lines, the optical axes of the optical fibers 17a and 17b are aligned with those of the optical waveguides 14a and 14b by mechanically fitting the fiber blocks 16a and 16b to the package 11 so that end faces of the optical fibers 17a and 17b shooting out from the optical fiber blocks 16a and 16b butt against the end faces of the optical waveguides 14a and 14b.

As mentioned in the above, the alignments of the optical axes of the optical transmission lines extending from the optical fibers 17a and 17b to the semiconductor optical amplifier 13 can be performed without adjustments by mounting the semiconductor optical amplifier 13 on the substrate 12 and fitting the fiber blocks 16a and 16b to the package 11 by means of the V grooves 15. As a result, troublesome works for the alignment of the optical axes becomes entirely unnecessary, and the low-priced optical module 10 can be provided in its turn.

On the other hand, as shown in FIGS. 3 and 4, the optical axes of the optical fibers 53 of the fiber connector 50 which is connected with the input or output end face of the optical module 10 can be aligned with those of the optical fibers 17a or 17b of the optical module 10 by fitting the guide pins 52 of the optical fiber connector 50 into the guide holes 18 of the optical fiber block 16a or 16b.

Since the fiber blocks 16a and 16b are fitted to the package 11 in condition that the optical fibers 17a and 17b are buried therein, even if an external force is applied to the fiber blocks 16a and 16b at the time of fitting or removing the optical fiber connector 56, the positions of the optical fibers 17a and 17b are not shifted, and the condition that these optical fibers are supported by the fiber blocks 16a and 16b can be maintained. That is to say, the insufficiency of the mechanical strength of means for supporting the optical fibers in the conventional optical module which has been a course of anxiety can be swept away, and the optical module 10 can withstand a load applied thereto in case that the optical connector 50 is repeatedly fitted into and removed from the optical module 10. Moreover, since the processes for specularly polishing the end surfaces of the optical fibers 17a and 17b to be connected with the optical fibers 53 of the optical fiber connector 50 can be easily performed at the stage of the fabricating the fiber blocks 16a and 16b, the optical module 10 having the low connection losses can be obtained.

Moreover, since alignments of the optical axes of the optical transmission lines extending from the optical fibers 17a and 17b to the semiconductor optical amplifier 13 can be performed without adjustments, the optical module 10 according to this embodiment is suited for an optical module to be connected with the optical fiber connector comprising single mode optical fibers in which tolerance limits of misalignments of the optical fibers are servere.

Although explanations are given to the case that the number of the optical fibers 17a or 17b supported by the fiber block 16a or 16b is eight in this embodiment, the similar effect can be obtained in case that the number of the optical fibers 17a or 17b is four, twelve, sixteen or more.

Figure 8:
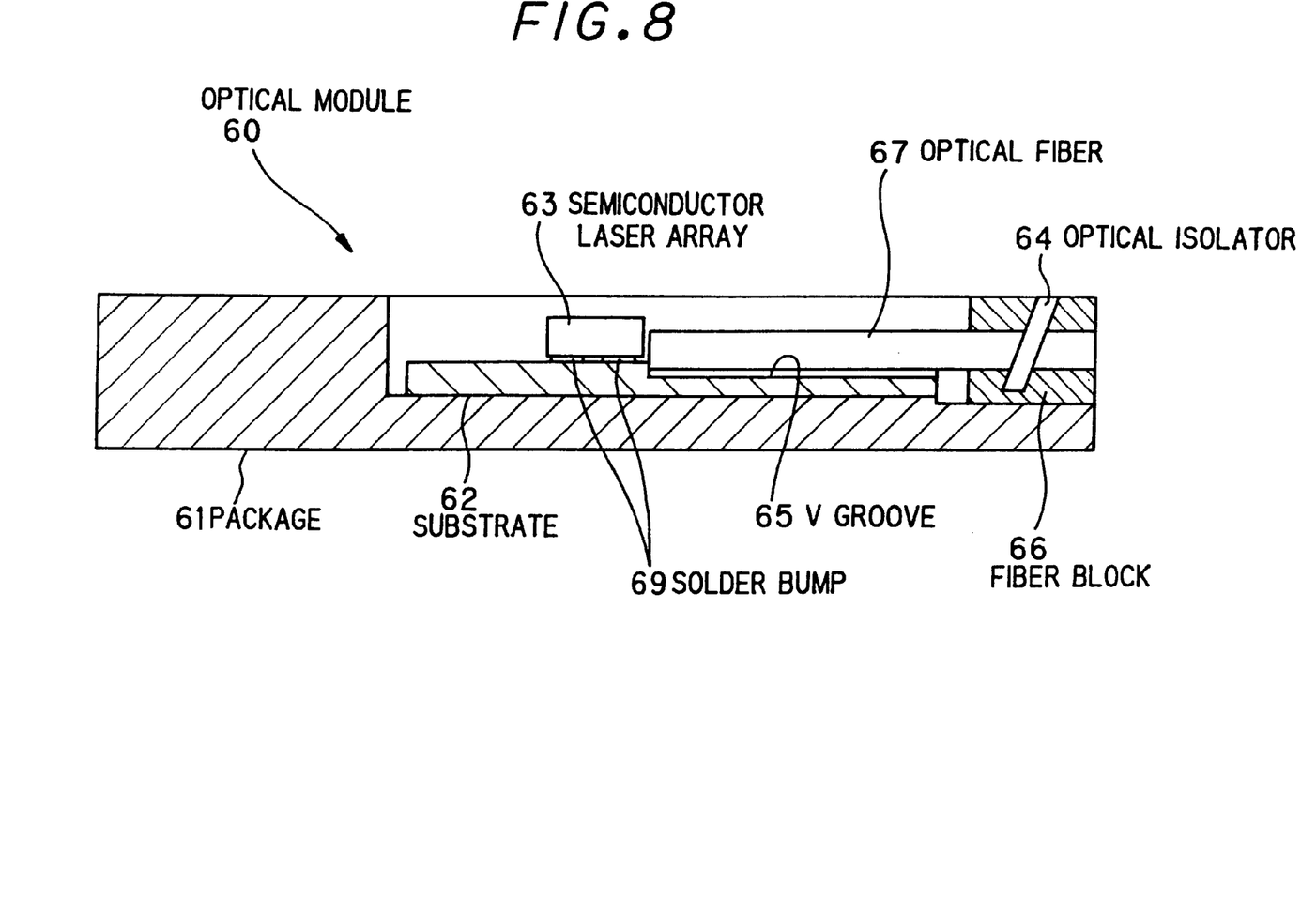
FIG. 8 shows a cross-sectional view of an optical module according to the second preferred embodiment of the invention in a vertical cross-section.

FIG. 8 shows a cross-sectional view of an optical module according to the second preferred embodiment of the invention. A semiconductor laser array 63 serving as an optical device is mounted on the optical module 60 according to this embodiment, and a laser lights emitted from the semiconductor array 63 are outputted via plural optical fibers 67. Similarly to the case of the first preferred embodiment, the optical fibers 67 are buried in a fiber block 66, which is fitted to a package 61 to form optical transmission lines extending from the semiconductor laser array 63 to the optical fibers 67.

The semiconductor laser array 63 is mounted on a substrate 62 via solder bumps 69 similarly to the case of the first preferred embodiment. Moreover, V grooves 65 are formed on a part of the substrate 62 which lies between the semiconductor laser array 63 and the fiber block 66 similarly to the case of the first preferred embodiment of the invention. According to the aforementioned configuration, the positionings of the optical axes of the semiconductor laser array 63 and the optical fibers 67 in the horizontal and vertical directions are accomplished by a self alignment effect of the bumps and the V grooves 65.

Moreover, the positionings of the optical fibers 67 in the direction of the optical axes thereof are carried out so that the end faces of the optical fibers 67 butt against the end walls of the V grooves 65. Accordingly, the optical axes of the semiconductor laser array 63 can be aligned with those of the optical fibers 67 without adjustment.

In the optical module according to the second preferred embodiment, an optical isolator 64 is inserted into the fiber block 66 in order to reduce an effect of a light reflected from a far end. When the optical isolator 64 is inserted into the fiber block 66, the optical fibers 67 are divided in the middle of the fiber block 66, and thereafter the optical isolator 64 is inserted between the divided optical fibers 67. Since the optical isolator 64 is inserted into the fiber block 66, the optical fibers 67 are divided in condition that they are supported by the fiber block 66.

In this way, misalignments of the optical axes of the divided optical fibers 67 do not occur. As a result, since there is no necessity for again aligning the optical axes of the divided optical fibers 67 with each other after the optical isolator 64 is inserted, the optical isolator 64 can be easily inserted into the optical module 60.

Figure 9:
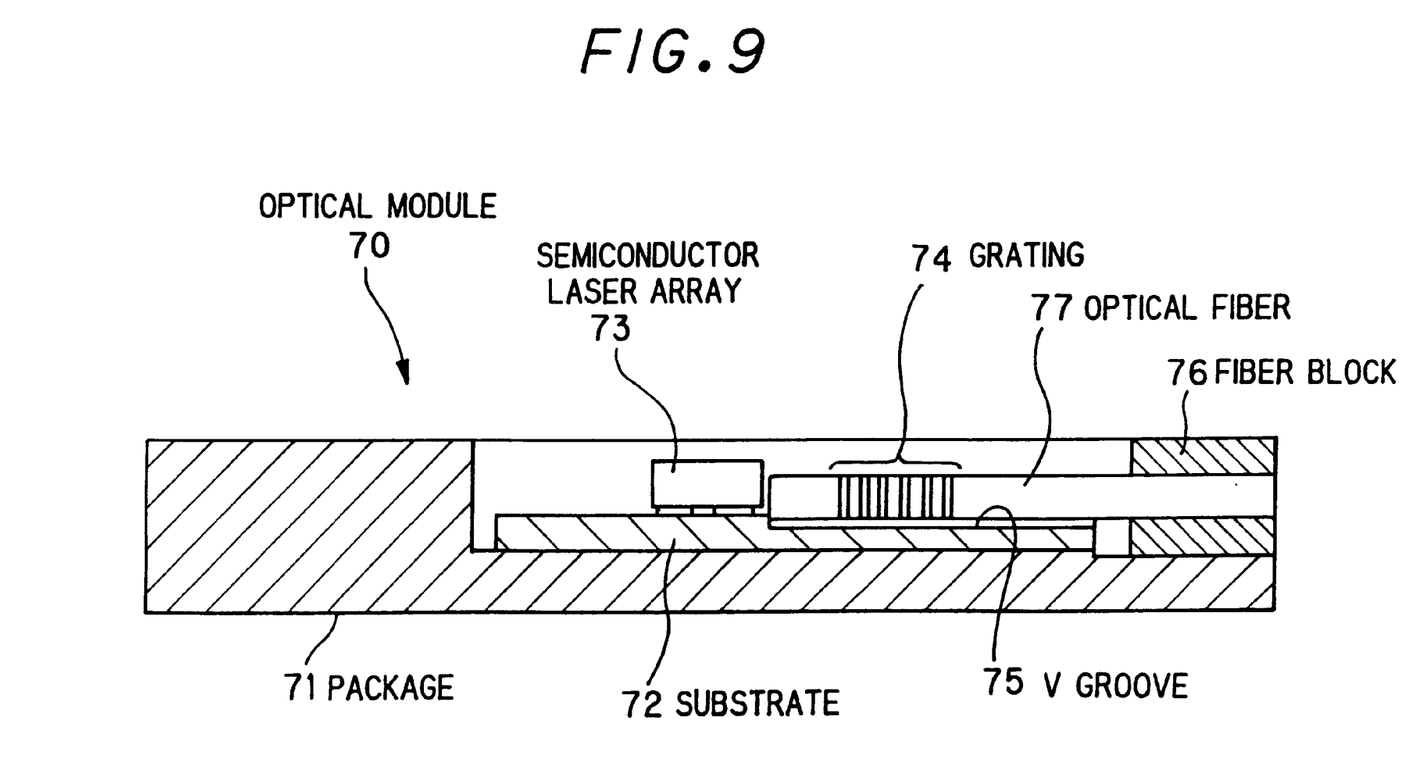
FIG. 9 shows a cross-sectional view of an optical module according to the third preferred embodiment of the invention in a vertical cross-section.

FIG. 9 shows a cross-sectional view of an optical module according to the third embodiment of the invention. Similarly to the case of the second preferred embodiment of the invention, a semiconductor laser array 73 serving as an optical module is mounted on the optical module 70, and lights emitted from the semiconductor laser array 73 are outputted via plural optical fibers 77. The optical fibers 77 are buried in the fiber block 76, and optical transmission lines extending from the semiconductor laser array 73 to the optical fiber array 77 are formed by fitting the fiber block 76 to the package 71.

In this embodiment, gratings 74 are provided for the optical module 70 in order to improve the wavelength selective characteristic of laser lights emitted from the semiconductor laser array 73. The gratings 74 are previously formed on the long optical fiber 77 at a predetermined interval. The long optical fiber 77 on which the gratings 74 are formed is cut into the short optical fibers, which are respectively buried in the fiber block 76. Then, there is no necessity separately forming the grating 74 on each of the optical fibers 77. Accordingly, the optical module 70 provided with the optical fibers 77 on which the gratings are formed can be easily fabricated.

Means for mounting the semiconductor laser array 73 on the substrate 72 and the method for the same, and means for positioning the optical fibers 77 relative to the semiconductor laser array 73 by means of the V grooves 75 formed on the substrate 72 are the same as those in the second preferred embodiment. Thereby, the optical axes of the semiconductor laser array 73 can be aligned with those of the optical fibers 77 without adjustments.

Figure 10:
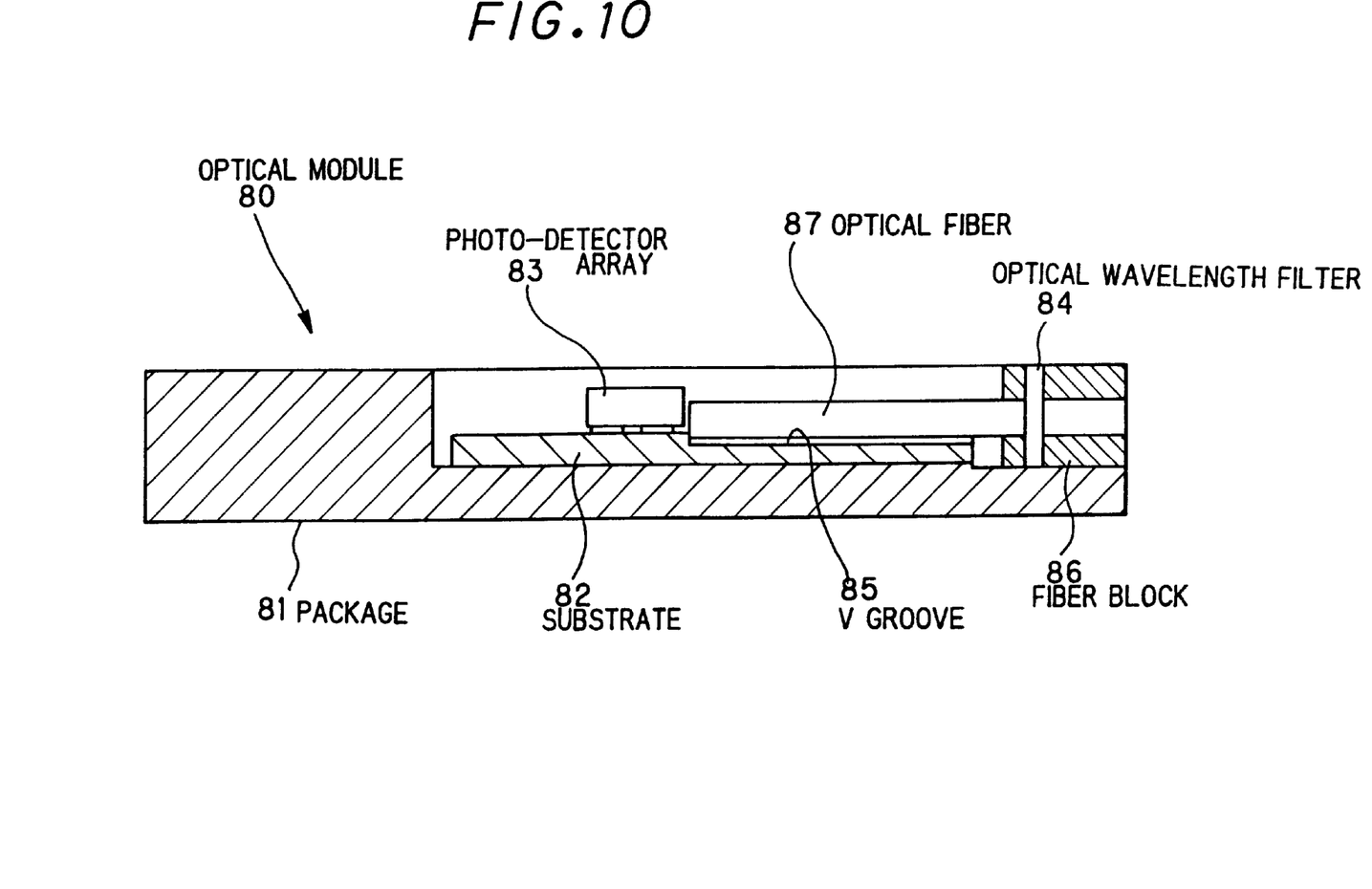
FIG. 10 shows a cross-sectional view of an optical module according to the forth preferred embodiment of the invention in a vertical cross-section.

FIG. 10 shows a cross-sectional view of an optical module according to the fourth preferred embodiment of the invention. A photo-detector array 83 serving as an optical device is mounted on the optical module 80 according to the invention, and optical signals supplied from plural optical fibers 87 are respectively detected by the photo-detector array 83. Similarly to the case of the first preferred embodiment, the optical fibers 87 are buried in the fiber block 86, and optical transmission lines extending from the optical fibers 87 to the photo-detector array 83 are formed by fitting the fiber block 86 to the package 81.

In this embodiment, an optical wavelength filter 84 is inserted into the fiber block 86 in order to improve the wavelength selective characteristics of the optical signals supplied to the photo-detector array 83. As mentioned in the above, since the optical wavelength filter 84 is inserted into the fiber block 86 in condition that the optical fibers 87 are supported by the fiber block 86, the misalignments of the optical axes of the optical fibers 87 and the optical photosensor array 83 do not occur. As a result, since there is no necessity for again aligning the optical axes of the optical fibers 87 with those of the photo-detector 83 after the optical wavelength filter 84 is inserted, the optical wavelength filter 84 can be easily inserted into the fiber block 86.

Means for mounting the photo-detector array 83 on the substrate 82 and the method for the same, and means for positioning the optical fibers 87 relative to the photo-detector array 83 by means of V grooves 85 formed on the substrate 82 are the same as those of the second preferred embodiment. As a result, optical adjustments for aligning the optical axes of the photo-detector array 83 with those of the optical fibers 87 become unnecessary.

Although the optical modules using the semiconductor optical amplifier of multi-channels, the semiconductor laser array and the photo-detector array as the optical devices have in explained as the examples of the embodiments, the optical devices to which the invention is applicable are never limited to the aforementioned ones.

Moreover, the invention can be applied to an optical module in which the semiconductor optical amplifier is replaced with the waveguides or the waveguide device such as an optical directional coupler, a WDM coupler, etc. In case that the optical device is a semiconductor laser array or a photo-detector array, the waveguide device may be inserted between the optical device and the output or input optical fiber. In this way, the performance and the utility of the optical module become higher by introducing the waveguides or the waveguide device thereinto, and the field of application of the invention is expanded.

The fiber block combined with the optical module may be the one corresponding to the MPO type fiber connector or the minature MPO fiber connector. According to the aforementioned fiber block, the connector can be easily fitted to and removed from the fiber block.

In case that the V grooves are formed by anisotropic etching, etchant suited for the process is not restricted to aforementioned KOH, and tetramethylammoniumhydrooxide may be used for this purpose. Moreover, the method for forming the V grooves is not restricted to anisotropic etching, and isotropic etching by means of dry etching can be adopted for the same purpose.

As mentioned in the above, according to the invention, since the plural optical fibers are supported by the fiber block which is fitted to the basic member using the V grooves formed on the substrate having the optical device mounted thereon as a guide, the optical module which makes optical adjustments for aligning the optical axes of the optical fibers with those of the optical device unnecessary and withstands the repeated load applied thereto in case that the optical fiber connector is fitted to and removed from the optical module can be provided.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical module detachably connectable to an external optical fiber connector supporting a plurality of external optical fibers, comprising:
   a substrate on which an optical device is mounted;
   a basic member on which said substrate is mounted;
   a block detachably fitted to said basic member at a side end thereof, said block containing a first predetermined length of a plurality of internal optical fibers such that a second predetermined length of a first end of said internal optical fiber protrudes from a first end face of said block to interface optically with said optical device and a second end of said internal optical fibers is exposed at a second end face of said block to interface optically with said external optical fibers; and
   a plurality of V grooves, each said V groove having an end wall designed to allow said first end of said internal optical fiber to abut said end wall, on said substrate supporting said first ends of said internal optical fibers protruding from said block.

2. The optical module defined in claim 1, further comprising:
   a plurality of guide holes formed on said second end face of said block, said guide holes interfacing to a corresponding plurality of guide pins of said external optical fiber connector, such that an optical axis of each said internal optical fiber on said second end face of said block aligns with an optical axis of a corresponding external optical fiber on said external optical fiber connector.

3. The optical module defined in claim 1, wherein said optical module is mounted on said substrate via a plurality of bumps, each said bump having a predetermined volume.

4. An optical module to be connected with and removed from an optical fiber connector supporting plural parallel optical fibers, comprising:
   a substrate on which an optical device is mounted;
   a basic member on which said substrate is mounted;
   a block which fits to said basic member at a side end thereof, said block projecting at a first end face a plurality of parallel optical fibers to be connected with said optical device and supports remainders of said optical fibers so that end faces of said remainders are exposed at a second end face of said block; and
   a plurality of parallel V grooves having end walls formed on said substrate, each said V groove supporting one of said optical fibers projected from said block, wherein a lateral pitch of said V grooves are a same as that of said optical fibers, and wherein:
   said optical device comprises a semiconductor optical amplifier,
   said blocks are respectively fitted to said basic member at both side ends thereof,
   said V grooves are formed on both sides of said semiconductor optical amplifier, and
   a plurality of parallel optical waveguides are formed on intermediate regions on said substrate lying between leading ends of said optical fibers and said semiconductor optical amplifier.

5. The optical module defined in claim 1, further comprising an optical mode field converter integrated on each of said plurality of internal optical fibers.

6. The optical module defined in claim 1, further comprising a grating on each of said plurality of internal optical fibers.

7. The optical module defined in claim 1, wherein one or more of said internal optical fibers are divided inside of said block, and an optical isolator is inserted into said divided optical fibers.

8. The optical module defined in claim 1, wherein one or more of said internal optical fibers are divided inside of said block, and an optical wavelength filter is inserted into said divided optical fibers.

9. A method for fabricating an optical module to be connected with and removed from an external optical fiber connector supporting plural parallel external optical fibers, comprising:
   forming a block for supporting a plurality of internal parallel optical fibers so that a first terminal end of said internal optical fibers protrudes a first predetermined distance from a first end face of said block and an opposite terminal end of said internal optical fibers are exposed at a second end face of said block,
   forming plural parallel V grooves having end walls and a same lateral pitch as that of said optical fibers on a substrate so that said projected optical fibers are supported by said V grooves,
   mounting said substrate having said optical device mounted thereon on a basic member, and,
   fitting said block to said basic member at a side end thereof such that said optical fibers are inserted into said V grooves and abut said end walls of said V grooves.

10. The method for fabricating an optical module defined in claim 9, further comprising:
    forming guide holes fitting to guide holes of said external optical fiber connector on said second face of said block so that an optical axis of each of said internal optical fibers respectively coincides with an optical axis of said external optical fibers.

11. The method for fabricating an optical module defined in claim 9, wherein forming said block further comprises:
    forming said block by an integral molding using said internal optical fibers as inserts.

12. The method for fabricating an optical module defined in claim 9, wherein said mounting said optical devices on said substrate further comprises:
    forming solder bumps on solder-wettable pads previously formed on said substrate;
    setting on said solder bumps the said optical device, and said optical device further having a bottom surface on which joining pads are previously formed; and
    melting said solder bumps.

13. A method for fabricating an optical module defined in claim 12, wherein said forming of said solder bumps further comprises:
    setting a solder sheet having a predetermined thickness on said solder-wettable pads;

forming solder bumps by punching said solder sheet; and thermally pressing said punched solder bumps against said solder-wettable pads.

14. The method for fabricating an optical module defined in claim 9, wherein said V grooves are formed by photolithography.

15. The method for fabricating an optical module defined in claim 9, wherein said forming of said block further comprises:

previously integrating an optical mode field converter on a long optical fiber, and providing plural short optical fibers to be supported by said block by dividing said long optical fiber on which said optical mode field converter has been integrated.

16. The method for fabricating an optical module defined in claim 9, wherein said forming of said block further comprises:

previously forming gratings on a long optical fiber at a predetermined interval; and providing plural short optical fibers to be supported by said block by dividing said long optical fiber on which said gratings have been formed.

17. The method for fabricating an optical module defined in claim 9, further comprising:

dividing said optical fibers within said block; and inserting an optical isolator into said divided optical fibers.

18. The method for fabricating an optical module defined in claim 9, further comprising:

dividing said optical fibers within said block; and inserting an optical wavelength filter into said divided optical fibers.

19. A method for fabricating an optical module to be connected with and removed from an external optical fiber connector supporting plural parallel external optical fibers, comprising:

forming a block for supporting plural parallel internal optical fibers so that said block projects a first section of said internal optical fibers at a first end face of said block and exposes end faces of a remaining section of said internal optical fibers at a second end face of said block;

forming plural parallel V grooves having end walls and a same lateral pitch as that of said optical fibers on a substrate so that said projected optical fibers are supported in said V grooves, mounting said substrate having said optical device mounted thereon on a basic member; and fitting said block to said basic member at a side end thereof such that said optical fibers are inserted into said V grooves and abut said end walls of said V grooves, wherein:

two blocks are formed in said step of forming said block, two groups of said V grooves are formed in said forming of said V grooves, said two groups of said V grooves being respectively formed near both side ends of said substrate, two groups of plural parallel optical waveguides are formed on said substrate, said two groups of said optical waveguides respectively starting from leading ends of said two groups of said V grooves, and said two blocks are respectively fitted to said basic member at both said side ends thereof in said fitting.

20. An optical module detachably connectable to at least one external optical fiber, comprising:

a substrate on which an optical device is mounted;

a basic member on which said substrate is mounted; and at least one block detachably fitted to said basic member at a side end thereof, said block containing a first predetermined length of at least one internal optical fiber such that a second predetermined length of said at least one internal optical fiber protrudes from a first end face of said block to connect optically with said optical device and an opposite end of said at least one internal optical fiber is exposed at a second end face of said block to connect optically with said at least one external optical fiber, and such that said substrate contains a groove having an end wall for each of said at least one internal optical fiber to support said protruded section of said at least one internal optical fiber, said end wall for permitting abutment of the end face of said at least one internal optical fiber.

21. The optical module defined in claim 20, further comprising:

an optical waveguide formed on said substrate for each of said at least one internal optical fiber, such that said optical waveguide provides optical coupling between said internal optical fiber and said optical device.

22. An optical module detachably connectable to at least one external optical fiber, comprising:

a substrate on which an optical device is mounted;

a basic member on which said substrate is mounted;

at least one block detachably fitted to said basic member at a side end thereof, said block containing a first predetermined length of at least one internal optical fiber such that a second predetermined length of said at least one internal optical fiber protrudes from a first end face of said block to connect optically with said optical device and an opposite end of said at least one internal optical fiber is exposed at a second end face of said block to connect optically with said at least one external optical fiber, and such that said substrate contains at least one groove to support said protruded section of said at least one internal optical fiber; and, an optical waveguide formed on said substrate for each of said at least one internal optical fiber, such that said optical waveguide provides optical coupling between said internal optical fiber and said optical device.

23. The optical module defined in claim 22, wherein each said groove on said substrate further comprises an end wall for permitting abutment of the end face of said at least one internal optical fiber.

* * * * *